United States Patent
Takemura et al.

(10) Patent No.: US 9,467,687 B2
(45) Date of Patent: Oct. 11, 2016

(54) VEHICLE-MOUNTED ENVIRONMENT RECOGNITION DEVICE

(71) Applicant: CLARION CO., LTD., Saitama-shi, Saitama (JP)

(72) Inventors: Masayuki Takemura, Tokyo (JP); Shoji Muramatsu, Saitama (JP); Masahiro Kiyohara, Tokyo (JP); Akira Utagawa, Tokyo (JP)

(73) Assignee: Clarion Co., Ltd., Saitama (JP)

( * ) Notice: Subject to any disclaimer, the term of this patent is extended or adjusted under 35 U.S.C. 154(b) by 0 days.

(21) Appl. No.: 14/410,392

(22) PCT Filed: Jun. 28, 2013

(86) PCT No.: PCT/JP2013/067898
§ 371 (c)(1),
(2) Date: Dec. 22, 2014

(87) PCT Pub. No.: WO2014/007175
PCT Pub. Date: Jan. 9, 2014

(65) Prior Publication Data
US 2015/0334385 A1 Nov. 19, 2015

(30) Foreign Application Priority Data
Jul. 3, 2012 (JP) .................. 2012-148977

(51) Int. Cl.
| | |
|---|---|
| *H04N 17/00* | (2006.01) |
| *H04N 5/225* | (2006.01) |
| *G06K 9/20* | (2006.01) |
| *G06K 9/00* | (2006.01) |
| *G08G 1/16* | (2006.01) |

(52) U.S. Cl.
CPC ........ *H04N 17/002* (2013.01); *G06K 9/00791* (2013.01); *G06K 9/20* (2013.01); *H04N 5/225* (2013.01); *G08G 1/16* (2013.01)

(58) Field of Classification Search
None
See application file for complete search history.

(56) References Cited

U.S. PATENT DOCUMENTS

| | | | |
|---|---|---|---|
| 6,037,976 A * | 3/2000 | Wixson | 348/122 |
| 6,607,606 B2 * | 8/2003 | Bronson | 134/6 |

(Continued)

FOREIGN PATENT DOCUMENTS

| | | |
|---|---|---|
| JP | 2001-199260 A | 7/2001 |
| JP | 2008-060873 A | 3/2008 |

(Continued)

*Primary Examiner* — Brian Yenke
(74) *Attorney, Agent, or Firm* — Volpe and Koenig, P.C.

(57) ABSTRACT

A vehicle-mounted environment recognition device includes an imaging unit that acquires an image taken by an imaging device; an image self-diagnosis unit that diagnoses contamination of a lens of the imaging device with respect to the image acquired by the imaging unit; an application execution unit that executes an application selected from a predetermined application group; and a fail determination unit that determines, on the basis of a diagnosis result from the image self-diagnosis unit, whether the lens contamination state is in an endurance range of the application and, if within the endurance range, sets the operation of the application executed by the application execution unit to a suppression mode. If outside the endurance range, contamination removal control is implemented, or a fail determination is made for the application. Contamination removal and fail determination can be implemented utilizing parameter adjustment and hardware, or an image-based self-diagnosis can be conducted.

7 Claims, 12 Drawing Sheets

Score example

Low ⇔ High

(56) References Cited

U.S. PATENT DOCUMENTS

| | | | |
|---|---|---|---|
| 7,423,752 B2* | 9/2008 | Leleve et al. | 356/338 |
| 7,619,650 B2* | 11/2009 | Bothe et al. | 348/187 |
| 8,503,728 B2* | 8/2013 | Takahashi | 382/104 |
| 8,786,697 B2* | 7/2014 | Kawasaki | 348/135 |
| 8,899,761 B2* | 12/2014 | Tonar et al. | 359/511 |
| 9,064,317 B2* | 6/2015 | Liu et al. | |
| 9,128,813 B2* | 9/2015 | Almedia et al. | |
| 2006/0082879 A1* | 4/2006 | Miyoshi et al. | 359/462 |
| 2007/0115357 A1* | 5/2007 | Stein et al. | 348/148 |
| 2007/0263902 A1* | 11/2007 | Higuchi et al. | 382/104 |
| 2008/0056537 A1 | 3/2008 | Furusawa | |
| 2008/0192984 A1 | 8/2008 | Higuchi et al. | |
| 2009/0315723 A1* | 12/2009 | Linsenmaier et al. | 340/583 |
| 2011/0073142 A1* | 3/2011 | Hattori et al. | 134/56 R |
| 2012/0117745 A1* | 5/2012 | Hattori et al. | 15/250.01 |
| 2014/0009615 A1* | 1/2014 | Kiyohara et al. | 348/148 |
| 2014/0333757 A1* | 11/2014 | Burke et al. | 348/113 |
| 2015/0009296 A1* | 1/2015 | Crona | 348/47 |
| 2015/0145956 A1* | 5/2015 | Hayakawa et al. | 348/46 |
| 2015/0172582 A1* | 6/2015 | Kiyohara et al. | |
| 2015/0177512 A1* | 6/2015 | Hayakawa et al. | |
| 2015/0201120 A1* | 7/2015 | Irie et al. | |
| 2015/0277111 A1* | 10/2015 | Bell et al. | |
| 2015/0298657 A1* | 10/2015 | Kanter et al. | |

FOREIGN PATENT DOCUMENTS

| | | |
|---|---|---|
| JP | 2008-197863 A | 8/2008 |
| JP | 2008-282067 A | 11/2008 |

* cited by examiner

Score example

Low ⇔ High

|  | Score on map | Type | Strength | Reliability |
|---|---|---|---|---|
| Lens waterdrop detection | O |  |  |  |
| Lens cloudiness detection | O |  | O | O |
| Low visibility detection | O |  |  |  |
| Reflection detection | O |  | O |  |
| Road surface water film detection | O |  |  |  |
| Travel road environment detection |  | O | O | O |
| Light source environment detection |  | O |  |  |
| Weather detection |  | O |  | O |

Low ⇔ High

Low ⇔ High

Low ⇔ High

Low ⇔ High

FIG. 12

|  | First suppression mode | Second suppression mode | Contamination removal hardware | Fail |
|---|---|---|---|---|
| Lens waterdrop detection | Region 20% | Region 25% | Region 25% | Region 40% |
| Lens cloudiness detection | Region 20%, (Strength 3+ Reliability 70%) | Region 25%, (Strength 4+ Reliability 70%) | Region 35%, (Strength 5+ Reliability 70%) | Region 30%, (Strength 5+ Reliability 90%) |
| Low visibility detection | Region 20% | Region 25% | Region 30% | Region 40% |
| Reflection detection | Strength 4 | Strength 5 | - | - |
| Road surface water film detection | Strength 2 | Strength 3 | - | - |
| Travel road environment detection | BottsDots Scratchy line Reliability 80% | Mud, Gravel road Reliability 80% | - |  |
| Light source environment detection | Dark night | Backlight | - | - |
| Weather detection | Mist | Accumulated snow/Rain | - | - |
| Wiper | Intermittent | Low/High | - | - |
| Contamination removal hardware information | During first operation | During second operation | - | During second operation and past |

FIG. 13

|  | First suppression mode | Second suppression mode | Contamination removal hardware | Fail |
|---|---|---|---|---|
| Lens waterdrop detection | Region 15% | Region 20% | Region 25% | Region 30% |
| Lens cloudiness detection | Region 15%, (Strength 2+ Reliability 60%) | Region 20%, (Strength 3+ Reliability 70%) | Region 25%, (Strength 4+ Reliability 70%) | Region 30%, (Strength 4+ Reliability 90%) |
| Low visibility detection | Region 15% | Region 20% | Region 25% | Region 35% |
| Reflection detection | Strength 3 | Strength 4 Strength 5 | - | - |
| Road surface water film detection | Strength 2 | Strength 3 | - | |
| Travel road environment detection | - | - | - | - |
| Light source environment detection | - | Backlight | - | - |
| Weather detection | Mist | Rain/Snow | - | - |
| Wiper | - | Intermittent Low/High | - | - |
| Contamination removal hardware information | During first operation | During second operation | - | During second operation and past |

FIG. 14

| | First suppression mode | Second suppression mode | Contamination removal hardware | Fail |
|---|---|---|---|---|
| Lens waterdrop detection | Region 10% | Region 15% | Region 20% | Region 30% |
| Lens cloudiness detection | Region 10%, (Strength 1+ Reliability 60%) | Region 15%, (Strength 2+ Reliability 60%) | Region 20%, (Strength 3+ Reliability 60%) | Region 30%, (Strength 4+ Reliability 70%) |
| Low visibility detection | Region 10% | Region 15% | Region 20% | Region 30% |
| Reflection detection | Strength 1 | Strength 2 | - | Strength 3 |
| Road surface water film detection | Strength 1 | Strength 2 | - | - |
| Travel road environment detection | - | - | - | - |
| Light source environment detection | - | Dark night/Backlight | - | - |
| Weather detection | Mist | Rain/Snow | - | - |
| Wiper | - | Intermittent Low/High | - | - |
| Contamination removal hardware information | During first operation | During second operation | - | During second operation and past |

FIG. 15

|  | First suppression mode | Second suppression mode | Contamination removal hardware | Fail |
|---|---|---|---|---|
| Lens waterdrop detection | Region 10% | Region 15% | Region 20% | Region 30% |
| Lens cloudiness detection | Region 10%, (Strength 2+ Reliability 60%) | Region 15%, (Strength 3+ Reliability 70%) | Region 20%, (Strength 4+ Reliability 70%) | Region 30%, (Strength 4+ Reliability 90%) |
| Low visibility detection | Region 10% | Region 15% | Region 20% | Region 25% |
| Reflection detection | - | - | - | - |
| Road surface water film detection | - | - | - |  |
| Travel road environment detection | - | - | - | - |
| Light source environment detection | Dark night | - | - | Backlight |
| Weather detection | Mist | Rain/Snow | - | - |
| Wiper | Intermittent | Low/High | - | - |
| Contamination removal hardware information | During first operation | During second operation | - | During second operation and past |

VEHICLE-MOUNTED ENVIRONMENT RECOGNITION DEVICE

TECHNICAL FIELD

The present invention relates to a device for recognizing vehicle-mounted environment of a subject vehicle using a vehicle-mounted camera.

BACKGROUND ART

In recent years, the vehicle-mounted camera for image recognition is becoming predominantly of the multi-application type where a plurality of applications is simultaneously executed. While the conventional vehicle-mounted camera has been mostly based on a system that utilizes a camera dedicated for image recognition, the number of systems is increasing in which the same camera is used for presenting a picture to the user and for image recognition. One example is Patent Literature 1.

In a multi-application vehicle-mounted camera that executes a plurality of applications simultaneously, a camera mounted outside the vehicle cabin may be utilized for image recognition. Thus, there is a need for a technology for detecting contamination or rain drops and determining whether the current state of the camera is utilizable for image recognition.

CITATION LIST

Patent Literature

Patent Literature 1: JP 2008-282067 A

SUMMARY OF THE INVENTION

Technical Problem

Conventionally, a given-up state of a single image recognition application is determined by determining contamination on a vehicle-mounted camera lens. However, while the conventional technique can determine that the lens state is not appropriate for image recognition commonly for multiple applications, it is difficult with this technique to take into consideration the difference in contamination resisting performance among multiple applications.

Thus, an object of the present invention to provide a vehicle-mounted environment recognition device that conducts an image-based self-diagnosis, at the optimum timing for each application, as to whether parameter adjustment, contamination removal using hardware, or fail determination is to be implemented.

Solution to Problem

In order to achieve the object, a vehicle-mounted environment recognition device according to the present invention includes an imaging unit that acquires an image taken by an imaging device; an image self-diagnosis unit that diagnoses contamination of a lens of the imaging device with respect to the image acquired by the imaging unit; an application execution unit that executes an application selected from a predetermined application group; and a fail determination unit that determines whether, based on a diagnosis result from the image self-diagnosis unit, a lens contamination state is in an endurance range of the application, and that sets an operation of the application executed by the application execution unit to a suppression mode if within the endurance range, or that implements contamination removal control or a fail determination for the application if outside the endurance range.

Advantageous Effects of Invention

A vehicle-mounted environment recognition device is provided that makes an image-based self-diagnosis, at the optimum timing for each application, as to whether parameter adjustment, contamination removal utilizing hardware, or fail determination is to be implemented.

The present specification incorporates the contents of the specification and/or drawings of Japanese Patent Application No. 2012-148977 as the basis of claim to priority of the present application.

BRIEF DESCRIPTION OF DRAWINGS

FIG. 12 illustrates an example of a lane recognition fail determination table.

FIG. 13 illustrates an example of a vehicle detection fail determination table.

FIG. 14 illustrates an example of a pedestrian detection fail determination table.

FIG. 15 illustrates an example of a sign detection fail determination table.

DESCRIPTION OF EMBODIMENTS

Embodiments of the present invention will be described with reference to the drawings.

Figure 1:
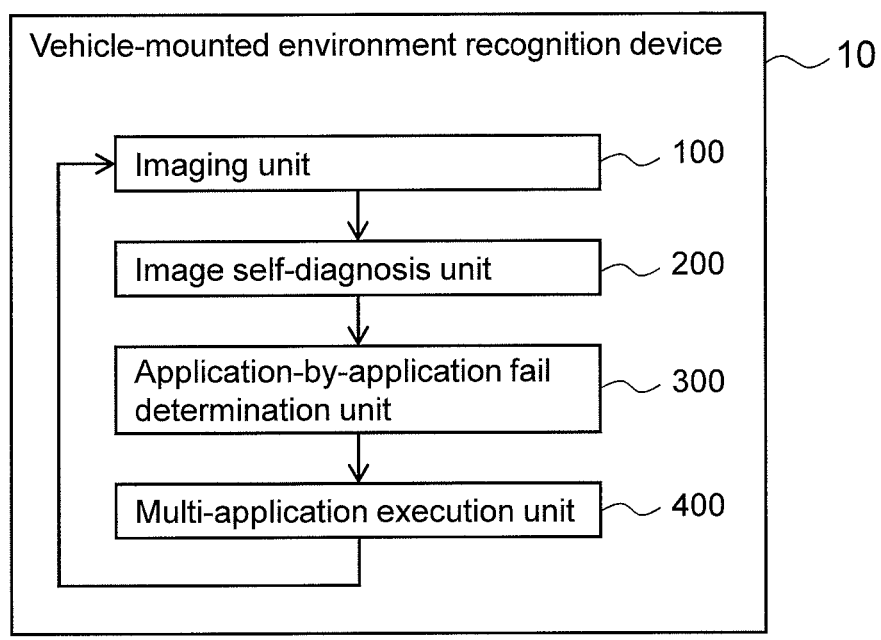
FIG. 1 is an explanation drawing illustrating the configuration of a vehicle-mounted environment recognition device according to an embodiment of the present invention.

FIG. 1 is a block diagram of a vehicle-mounted environment recognition device 10 according to an embodiment of the present invention. An imaging unit 100 acquires an image from a vehicle-mounted camera (not shown). The image is utilized in an image self-diagnosis unit 200 to detect lens water droplets, lens cloudiness, lens reflection, a low visibility region, contamination, road surface reflection, road surface water film, road surface sludge, light source environment, weather and the like. The result of detection is utilized for determining a status where erroneous detection, lack of detection and the like tends to be caused during multi-application execution, and to then determine a subsequent response method. The image self-diagnosis unit 200 may acquire subject vehicle travel information (such as vehicle speed, steering angle, yaw rate, windshield wiper, and outer air temperature) obtained through CAN communication, or information about subject vehicle's GPS position or a road map and the like obtained from a car navigation system, and use them as material for making a decision. Weather information or atmospheric temperature information may be acquired from a server and the like, or a millimeter-wave radar, vehicle-to-vehicle communication, road-to-vehicle communication and the like may be utilized so as to provide information utilized for increasing the accuracy of image diagnosis.

An application-by-application fail determination unit 300 determines how the system should respond on an application-by-application basis on the basis of the information detected by the image self-diagnosis unit 200, such as lens water droplets, lens cloudiness, lens reflection, low visibility region, contamination detect, road surface reflection, road surface water film, road surface sludge, light source environment, or the weather and the like. For example, when a lens has water droplets, the response method is modified depending on in which region on the image the water droplets are present and how much.

First, between multi-application lane recognition and vehicle detection, whether or not there is an influence varies depending on where the water droplets are because the processing region is different. By considering the extent of influence on an application-by-application basis, it can be determined to stop the recognition process only of an application having a large influence, for example. Thus, the need for necessarily stopping the operation of an application with small influence can be eliminated.

When the recognition accuracy of a certain application is significantly decreased, the starting of hardware for removing the cause may be implemented. By implementing the starting of hardware for water droplets removal focusing on an application among applications currently in real-time operation status of which recognition performance decreases the earliest, it becomes possible to implement hardware starting at necessary timing for maintaining recognition performance without implementing hardware starting earlier than necessary.

Further, because the extent of influence can be considered on an application-by-application basis, it becomes possible to enter the device into an erroneous detection suppression mode, such as dynamically modifying the software process parameters or additionally activating an erroneous detection suppression process. Thus, a configuration is obtained which can be readily utilized for increasing durability on the application side prior to the starting of hardware or fail determination.

A multi-application execution unit 400, in response to a result from the application-by-application fail determination unit 300, executes an appropriate response, such as parameter adjustment or deactivating an operation due to contamination, on an application-by-application basis. When it is determined that the lens is in normal state, the multi-application execution unit 400 implements multiple applications for normal execution and the like.

Figure 2:
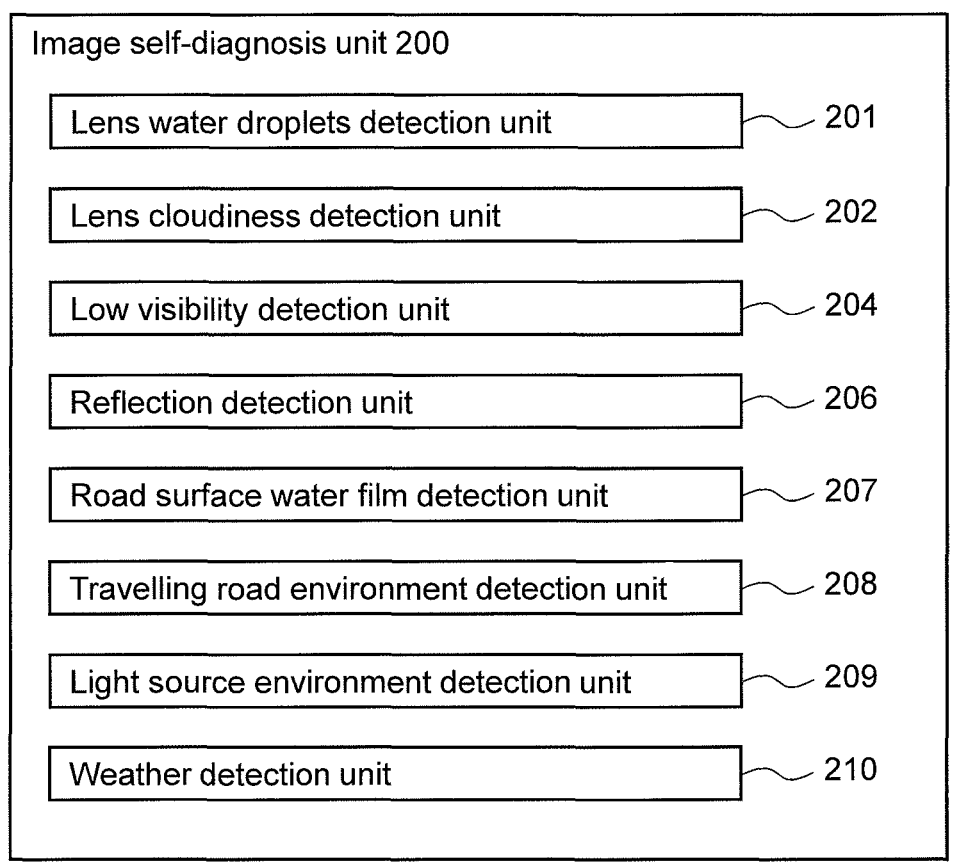
FIG. 2 is an explanation drawing illustrating the configuration of an image self-diagnosis unit according to an embodiment of the present invention.

FIG. 2 is an explanation drawing of an example of the overall configuration of the image self-diagnosis unit 200 according to the embodiment of the present invention and detection units provided therein. Here, it is determined whether the lens status, travelling road environment, light source environment, weather and the like are suitable for lane recognition, vehicle detection and the like through image recognition executed in the multi-application execution unit 400. Here, initially, a preliminary process is performed, regardless of individual applications, to detect, for example, in what contamination status the state of the lens as a whole is in and in what environment.

Depending on the type of contamination and the type of environment of the lens, the subsequent system response will be changed and the application durability will also be changed. Thus, various detection units are present for the lens status and environment. For example, ruts of snow formed by accumulation of snow on the road surface have low durability because the status is subject to erroneous detection for lane recognition due to a number of white noise factors on the road. The ruts, however, have high durability for vehicle detection because the status is not such that the recognition performance is greatly decreased.

Conversely, when the status is such that, for example, an image is disturbed by the attachment of water droplets and the like on the lens, durability is low in the case of a vehicle detection technique that detects vehicle movement on the image because the water droplets act as a noise factor during the detection of movement of a feature point of the vehicle. However, for lane recognition, durability is high as long as the water droplets as the noise factor are such that even if there is some white line feature amount, it does not appear linear and does not provide a large performance decrease factor. Therefore, by monitoring the contamination status on a type by type basis, a suppression mode, contamination removal hardware control, fail determination and the like can be executed at appropriate timing as a system.

For the detection units in the image self-diagnosis unit 200, a processing period corresponding to their respective properties is set. For example, in consideration of the headlight and the like of adjacent vehicles that changes from moment to moment, a time-delayed reflection position and the like would be provided in the case of a reflection detection unit 206 unless the processing period is the same as the processing period of an application of the multi-application execution unit 400, or equivalent to the processing period of the application with the highest processing period in the application execution unit. Such time-delayed position is not readily usable for erroneous detection suppression. Thus, the reflection detection unit 206 has the same period as the application execution unit. Similarly, the same period of 100 msec is set for a road surface water film detection unit 207 as for the application execution unit.

Meanwhile, for a lens water droplets detection unit 201, a lens cloudiness detection unit 202, a low visibility detection unit 204, a travelling road environment detection unit 208, a light source environment detection unit 209, and a weather detection unit 210, the state does not change quickly, and therefore they do not require processing in every period. Thus, in order to reduce processing load, the processing period is set for 500 msec, and past determination results are utilized during un-processing periods so as to enable efficient monitoring of lens status.

Not all of the applications are operating in a certain 100 msec period within the 500 msec. In order to utilize the remaining time in the multi-application execution unit 400 and to allow the multi-application execution unit to operate at 100 msec intervals, the detection units in the self-diagnosis unit that can be started in the remaining time are started. For example, in the initial 100 msec period, the reflection detection unit, the road surface water film detection unit, the lens water droplets detection unit, and the lens cloudiness detection unit are called; in the next 100 msec period, the low visibility detection unit is called in addition to the reflection detection unit and the road surface water film detection unit, and so on. In this way, image self-diagnosis is implemented properly within the remaining time.

The lens water droplets detection unit 201 detects the status of water droplets attached to a lens, such as water droplets attached to a lens; raindrops during rain; water droplets attached to the camera lens due to splashing of water from a wet road surface by a tire; mist; or dew and the like. When the state is such that water droplets are attached to the lens, it becomes difficult to execute multiple applications with the same performance as normally. Thus, in accordance with the water droplets detection state, a suppression mode/contamination removal hardware/fail determination is executed.

According to a water droplets detection technique, if a location is found that stays at substantially the same position for longer than a certain time and where brightness is higher than in surrounding regions even though the background flows farther away because the camera is installed in the vehicle, that location is extracted as having high probability of being water droplets attached to the lens and appearing as white light.

Figures 6, 7:
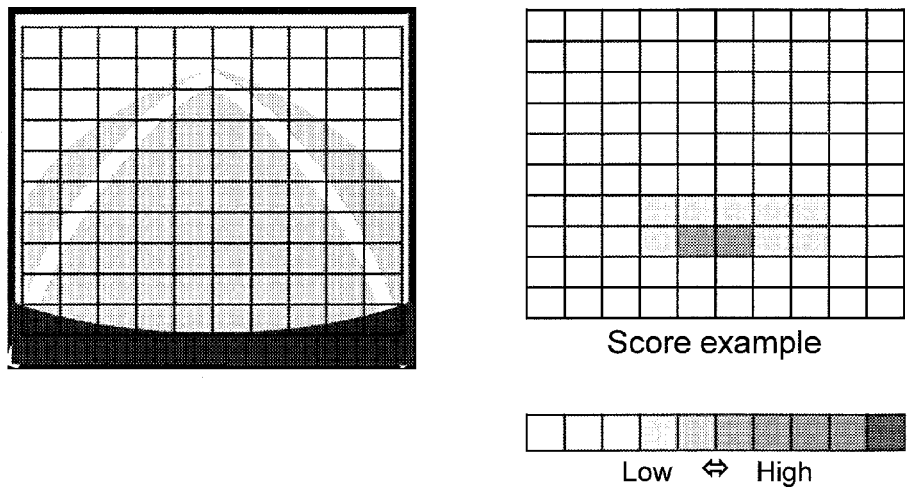
FIG. 6 illustrates a lens state map and a score explanation drawing.
FIG. 7 is an explanation drawing of an image self-diagnosis output table.

The image self-diagnosis unit 200 produces an output as illustrated in FIG. 6 where an image is divided into a grid creating a map. On the map, there are shown positions at which locations with higher brightness than in surrounding regions have been discovered, and scores indicating the degree of attachment of water droplets on the lens, the scores indicating the probability of water droplets attachment on a position by position basis. The water droplets scores shown on the map are utilized in the application-by-application fail determination unit to determine the response technique in the event of water droplets attachment on an application-by-application basis.

The vehicle-mounted camera, after a long period of travel, for example, may become cloudy due to slight contamination on the lens, resulting in a blurred image status where a clear image cannot be taken. The lens cloudiness detection unit 202 estimates the degree of cloudiness and reliability, and also detects whether the lens is clouded uniformly or in patches, and the level of cloudiness and the like.

In the lens clouded state, it is difficult to execute multiple applications with the same performance as normally. Thus, the state of lens cloudiness detection is utilized for the suppression mode/contamination removal hardware/fail determination.

There are two techniques for cloudiness detection. A technique detects the clouded state of the lens on the assumption that the screen is entirely detected. In this technique, the degree of the lens clouded state is numerically expressed using, for daytime, the edge strength on the horizon and, for nighttime, the sharpness of change in the brightness of the headlight of a vehicle behind as an indicator, and reliability using chronological-direction data is calculated.

According to a technique utilized for a single lane recognition application, the edge strength of a lane as the object of detection is analyzed in chronological direction so as to determine an edge threshold value for a lane mark feature amount extraction amount for lane recognition, whereby a high recognition rate has been successfully ensured while suppressing erroneous recognition by threshold value adjustment in accordance with the road surface state and the lens state.

However, when a vehicle or a pedestrian and the like is the object of detection, a constant presence cannot be assumed as in the case of a white line, and it is difficult to analyze with what edge strength the vehicle or pedestrian is present on the screen. Thus, focusing on the fact that the horizon is an edge that is constantly present on the image, the edge strength near the horizon is analyzed to enable stable estimation of the edge strength of the object of detection on the screen.

For the daytime, the screen is divided into three sections of left, right, and center sections near the horizon, and edge strength analysis is implemented. This is to reduce the influence of background structures in no small measure. For example, when there are quite a few structures in the distance, the edge strength near the horizon at the image center becomes inevitably low. However, the influence of the presence or absence of the structures can be reduced by performing the analysis including the left right regions including a nearby region. Depending on the application, the regions for edge strength analysis are properly selected and utilized as the edge threshold value at the time of detection.

The other technique is a method whereby the cloudiness status on the lens is detected as a map score on a grid as in the case of water droplets. The cloudiness detected by this technique is a thin contamination attached to the lens in patches rather than a uniform cloudiness. Specifically, the method detects a thin contamination when an edge continues to exist at the same location of the lens and in the same direction, in terms of a reliability score based on the location and the time of presence. In the case of a vehicle-mounted camera, the travelling background should flow at the same speed as subject vehicle. Thus, a feature that continues to be present at the same location in the same edge direction has high probability of being a contamination component that continues to be present on the lens. Accordingly, the position of a patchy contamination or a thin outlined contamination on the lens is detected as a score on the map.

The low visibility detection unit 204 detects a status such that, when a picture line is broken, for example, a part of the image is made invisible by an object attached to the front of the camera, such as mud. In other examples, the low visibility detection unit 204 may also detect zero visibility due to splashed snow or while travelling with the vehicle body covered in snow, or a low visibility region when the image is partially invisible.

In accordance with the low visibility region, it is considered whether a fail determination should be made for a multi-application operation in a subsequent-stage process on an application-by-application basis. If only a small region has low visibility, an attempt is made to implement the starting of contamination removal hardware for removing the problem. If the region is smaller, a suppression mode response is made so as to suppress erroneous detection.

The low visibility detection detects where on the lens the contamination is attached, as in the case of the detection of water droplets. Contrary to water droplets, when mud and the like are attached during daytime, the ambient brightness should be constant and the background should flow away. Thus, when a location that continues to be present at substantially the same position for longer than a certain time and with substantially a constant brightness is discovered, the detection result is output as a score on the map.

The reflection detection unit 206 detects a high brightness region on the road surface under a wet road surface status due to nighttime vehicle headlight or street lamps, road surface reflection by late-afternoon sunlight, or rain, including a road surface reflection stronger than normal, street lamps, shop lights and the like.

Depending on the road surface reflection region and its brightness and reflection direction, a countermeasure is implemented by, for example, stopping a subsequent-stage image process using multiple applications. For a region that does not have high brightness but from which reflection is estimated to be extended, an erroneous detection may readily occur. Thus, depending on the application, erroneous detection suppression is implemented by removing the region from the object of image processing, for example. Depending on the size or strength of the reflection region, suppression mode or fail determination is implemented. Because road surface reflection is not indicative of lens contamination, contamination removal hardware is not started.

The image self-diagnosis unit 200, as well as extracting the high brightness region, estimates a road surface reflection region thereof and expresses the region as a score on the map. In water droplets detection, cloudiness detection, and low visibility detection, the length of time of presence corresponds to the magnitude of the score, whereas in road surface reflection detection, a region predicted to reflect with higher brightness is given a higher score. In this way, the response method is determined on an application-by-application basis in a subsequent-stage process.

A road surface water film detection unit 207 detects the status as to whether the road surface is wet or dry. When the road surface is in wet status, reflection of headlight and the like tends to occur. Thus, depending on the application in the subsequent-stage, a suppression mode is entered for implementing an erroneous reflection detection countermeasure or parameter adjustment for erroneous reflection detection. When the road surface is wet, the status is such that the lens may be readily contaminated by water droplets and the like being splashed from the road surface and becoming attached to the lens. Thus, selection may be made to start lens protecting hardware.

First, it is determined whether the road surface is wet. The road surface may be determined to be wet based on the operation status of the front windshield wiper or the result of water droplets detection. A status that cannot be determined by the above is, for example, a status such that the road surface is wet although there is no rainfall, and there is no rolling up of water droplets onto the lens due to splashing. In such a case, reflection of the surrounding environment onto the road surface may be analyzed to provide an indicator of the ease of reflection on the road surface as a water film detection result.

If it is daytime, a determination is implemented as to whether the road surface is such that a structure is reflected onto the road surface and thereby provides a factor for erroneous detection, based on the background of the surrounding environment of the subject vehicle. More importantly for image recognition than whether the road surface is actually wet, when the status is such that there is background reflection due to reflection by the road surface, it is desirable to suppress erroneous detection by the reflection of a structure and the like on the road surface. Thus, the reflection of the background on the road surface is analyzed to adjust the threshold value for how to handle the recognition application. When there is sharp reflection on the road surface, the edge threshold value for vehicle detection or pedestrian detection is increased so as to suppress erroneous detection.

A travelling road environment detection unit 208 detects whether the travelling road surface is that of a paved road or a road covered with gravel, sand, earth, or accumulation of snow. In the case of gravel, sand, or mud roads where obviously there is no white line, when the lane recognition application is placed in the suppression mode to prevent an erroneous detection, the application may be stopped so as to completely prevent a warning, or only the warning or control may be stopped. In the case of sand or earth roads, there is a very high probability of mud and the like being rolled up by the vehicle and becoming attached to the lens. Thus, a lens protection function may be activated to prevent the attachment of mud, or contamination removal hardware may be activated regularly or in accordance with the mud detection result so as to protect the lens.

The vehicle outer air temperature is utilized as one piece of information about freezing or accumulation of snow. The lane recognition result is also utilized for determining whether a lane is present in the road, or whether a mud road surface or a gravel travel lane is not present. In such determination of the road status, when the vehicle outer air temperature is below zero, the vehicle outer air temperature is utilized as a factor in determining an environment such that the white line is made invisible by the accumulation of snow. Information about a tire spin due to vehicle behavior, the steering wheel steering status, vehicle body rocking and the like may also be utilized in determining whether a lane suitable for vehicle travel is present in the road, whether a mud or gravel lane is not present in the road, or whether there is an accumulation of snow on the road surface.

A light source environment detection unit 209 detects the ambient light source environment, such as the morning, daytime, evening, night, a dark night, ambient illumination and the like, based on the camera exposure, shutter speed, gain value, time, a high brightness region on the image and the like. Particularly, backlight in the morning or that of late-afternoon sunlight creates a status prone to performance degradation in image recognition. Thus, such backlight is adequately detected, and modification of a processing region, transition to suppression mode for implementing parameter modification, or fail determination is implemented by the application.

Road surface reflections of late-afternoon sunlight, a car behind, street lamps and the like tend to create scenes where erroneous detection or a lack of detection is caused by multiple applications for lane recognition, vehicle detection, pedestrian detection and the like. Thus, reliability and reflection strength scores of the surrounding environment as to the likelihood of road surface reflection are estimated. Also, concerning whether reflected light is instantaneously entering the processing region, a reflection region is estimated by extracting a high brightness region. Particularly, a general three-dimensional position of the headlight of a car behind can be estimated from the direction and height of the headlight. Thus, a reflection countermeasure is implemented by utilizing the three-dimensional position. Whether the road surface is wet and in an easily reflecting status based on the weather status is also considered for masking positions on the map such as shown in FIG. 6 that are not be utilized for image recognition, for example.

A weather detection unit 210 detects the weather status, such as rainfall, snowfall, mist, cloudy, fine, etc., and their levels. Based on the detection, parameter adjustment and the like for preventing erroneous detection by applications is implemented at separate timings for each application, or, fail determination is automatically implemented to stop the operation of the application so as to prevent erroneous detection because performance may not be ensured depending on the application.

Estimation of the weather status is implemented based on the background, the road surface edge strength, the brightness of an air region, the status of attachment of water droplets on the lens, vehicle windshield wiper information, outer air temperature and the like. The type of weather and its reliability are estimated and output.

Figure 3:
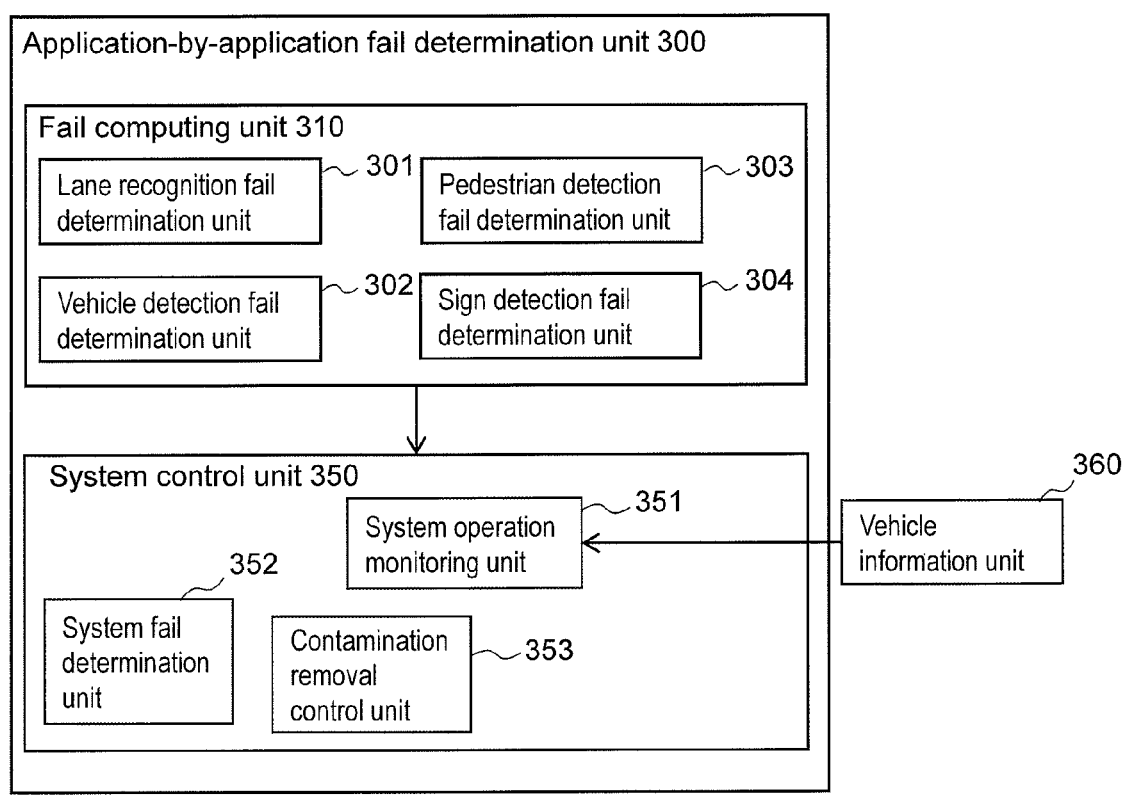
FIG. 3 is a block diagram of a configuration of an application-by-application fail determination unit 300.

FIG. 3 is a block diagram of the configuration of the application-by-application fail determination unit 300. Here, based on the result of detection by the image self-diagnosis unit 200, fail determination is implemented on an application-by-application basis. The symptoms detected by the image self-diagnosis unit 200, such as water droplets, cloudiness and the like have different durability depending on the application even in the same status. Thus, taking an appropriate action on an application-by-application basis provides a number of advantages, such as an increase in the applicable range of applications that can be operated by the system as a whole. Starting the fail determination or the contamination removal hardware without considering the applications and the like of which operations are stopped also provides the advantage of an increase in the applicable range of the system as a whole.

A fail computing unit 310 determines, on an application-by-application basis, whether a start request is to be issued for starting the erroneous detection suppression mode for fail, parameter adjustment, or durability increase, or the contamination removal hardware, and delivers the information to a system control unit 350. Such application-by-application fail determination is necessary because the degree of performance degradation and the need for contamination resistance reinforcement adjustment vary from one application to another depending on the type or level of contamination.

A system control unit 350 makes a determination for the system as a whole by combining the application-by-application request information from the fail computing unit 310. While an application-by-application fail determination is reflected as is, a fail determination for the system as a whole is implemented by a system fail determination unit 352 when there is no application that can be operated by the system as a whole including an operation-stopped application being monitored by a system operation monitoring unit 351.

Obviously, if the concept is to trigger an early fail and not permit erroneous detection, a fail determination may be made for the system as a whole when even a single application is determined to be in fail state, whereby the system can be constructed such that multiple applications are implemented only when reliability is higher.

The parameter adjustment or additional module operation for reinforcing the contamination resistance of each application is implemented as a suppression mode in accordance with a request from each application. When an individual application determines that stable detection will be difficult with only the parameter adjustment or the starting of an additional module for reinforcing the contamination resistance, the application issues a contamination removal request to a contamination removal control unit 353.

Upon reception of the contamination removal request from a currently operating application, the contamination removal control unit 353 attempts implementation of a hardware operation for contamination removal. The system operation monitoring unit 351 also monitors the history and the like of past implementation status of the contamination removal hardware, and makes a fail determination as a system or, if the contamination removal is successful, a determination to return to normal operation, while confirming the status of contamination reduction and the like after the start of the contamination removal hardware.

Other than the application-by-application determination, a final determination is implemented in the system control unit 350 based on contamination removal hardware control information or information acquired from a vehicle information unit 360. For example, it is assumed that, when information requesting the implementation of a first suppression mode in the lane recognition fail determination unit 301 is input to the system control unit 350, implementation of contamination removal hardware is determined upon request from the pedestrian detection fail determination unit 303. In this case, the system control unit 350 determines the suppression mode of the operation mode of an application at the time of starting of the hardware or in a certain period before and after the starting.

For example, during the starting of the contamination removal hardware, lane recognition is set to a second suppression mode so as to suppress erroneous detection. When lens contamination is being removed, the lens state is changed. Thus, if the image from which contamination is being removed is considered in the same way as the object of recognition during normal time, the probability of erroneous detection will be increased. Accordingly, during the starting of the contamination removal hardware, it may be preferable to utilize the second suppression mode. If there is a request from another application during the starting of hardware, such adjustment is implemented in the fail computing unit 310.

Further, when the contamination removal hardware is compulsorily started based on the information from the vehicle information unit 360, if the first suppression mode and the like is utilized so as to suppress erroneous detection due to the blinking and the like of the vehicle's blinker, for example, it is determined in the system operation monitoring unit 351 what suppression mode should be employed, and a final determination is implemented in the system control unit 350 based on the result of the determination.

In the fail computing unit 310, the first suppression mode, the second suppression mode, the starting of the contamination removal hardware, or fail determination is implemented on an application-by-application basis. The first suppression mode indicates a status which is not preferable for appropriate detection for the object application, and indicates a mode for starting of an additional module for erroneous detection suppression or implementing parameter modification. The second suppression mode indicates a status such that image recognition is even more difficult than in the status of the first suppression mode, and is a mode for additionally implementing further adjustment for erroneous detection suppression. When the lens state is such that no response can be made even in the second suppression mode, the fail computing unit 310 implements a hardware start request for removing the contamination. If the lens state does not improve even after the start of the contamination removal hardware, the fail computing unit notifies the system control unit 350 of a fail determination result.

In the fail computing unit 310, a fail determination unit is prepared for each of the multiple applications, and a computation process is implemented in consideration of the contamination durability of each application. While one type of contamination map is provided for each contamination type, when the contamination map is referenced for conversion into a score, strength, region, reliability, flag and the like utilized for fail or suppression mode determination, the conversion is performed in accordance with the performance of each application, whereby a determination can be made in further accord with each application. Particularly, because the processing region, the region-by-region importance, the brightness difference causing erroneous detection, and the degree of influence of each contamination differ on an application-by-application basis, each contamination map is converted into the values in tables shown in FIGS. 12 to 15 by taking these into consideration.

In consideration of the difference in the technique for detecting road surface reflection or water droplets between day and night, the threshold values of the tables shown in FIGS. 12 to 15 for the contamination-by-contamination application response methods may be adjusted, or the score conversion may be implemented such that the threshold values become constant, by taking the reliability or stability of each logic into consideration.

In accordance with the result from the weather detection unit, the threshold values for road surface reflection or water droplets detection in FIGS. 12 to 15 may be modified. Depending on the weather, the status may be more likely such that road surface reflection is readily caused or water droplets may readily become attached. Thus, it may be considered that the probability of erroneously entering the suppression mode is low, and the threshold value may be modified such that the suppression mode is readily entered even when the score of road surface reflection or water droplets detection is lower than normal.

When the lens is clouded, the screen may become too blurred to make a determination of water droplets attached to the lens or mud causing low visibility. Thus, also in order to suppress erroneous determination, the water droplets detection or low visibility score maps may be eliminated from the object of reference in the fail computing unit 310 at the point in time when the lens cloudiness has exceeded a certain constant threshold value, so that the water droplets or low visibility map can be referenced only when the cloudiness score is less than the certain constant threshold value.

Next, the fail determination units in the fail computing unit 310 will be described. The lane recognition fail determination unit 301 implements the fail determination during lane recognition operation. FIG. 12 shows an example of the lane recognition fail determination table where threshold values are set in accordance with the lane recognition durability. The example shows that, when the respective image diagnosis results indicate values equal to or greater than the numerical values, the first or the second suppression mode, the implementation of the contamination removal hardware, or fail determination is selected.

In the initial stage, the first suppression mode is selected. As the contamination or the environment becomes harsher, the mode successively transitions to the selection of the second suppression mode, contamination removal hardware, and fail. However, when the contamination state is improved after the contamination removal hardware is implemented, the mode may return to the suppression mode or normal state in accordance with the improved status of the self-diagnosis result. Because the environment state detection result (reflection, road surface water film, travelling road environment, weather) cannot be improved by the operation of the contamination removal hardware, the contamination removal hardware is not started except for contamination detection (water droplets, cloudiness, low visibility). Further, the fail determination unit implements fail determination in accordance with the result of detection of water droplets, cloudiness, or low visibility.

A vehicle detection fail determination unit 302 implements fail determination during a vehicle detection operation. FIG. 13 illustrates an example of a vehicle detection fail determination table. In the table, threshold values corresponding to the vehicle detection durability are set. When the image diagnosis result indicates a value equal to or greater than the numerical values, the first or the suppression mode, the implementation of the contamination removal hardware, or fail determination is selected.

In the initial stage, the first suppression mode is selected. As the contamination or environment becomes harsher, the mode successively transitions to the selection of the second suppression mode, contamination removal hardware, and fail. However, when the contamination state is improved after implementation of the contamination removal hardware, the mode may return to the suppression mode or normal state in accordance with the improved status of the self-diagnosis result. Because the environment state detection result cannot be improved by the operation of the contamination removal hardware, the contamination removal hardware is not started except for contamination detection. Further, the fail determination unit implements a fail determination in accordance with the result of detection of water droplets, cloudiness, or low visibility.

The pedestrian detection fail determination unit 303 implements a fail determination during a pedestrian detection operation. FIG. 14 shows an example of a pedestrian detection fail determination table. In the table, threshold values corresponding to the pedestrian detection durability are set. When the image diagnosis result indicates values equal to or greater than the numerical values, the suppression mode, implementation of the contamination removal hardware, or fail determination is selected.

In the initial stage, the first suppression mode is selected. However, as the contamination or environment becomes harsher, the mode successively transitions to the selection of the second suppression mode, the contamination removal hardware, and fail. However, if the contamination state is improved after implementation of the contamination removal hardware, the mode may return to the suppression mode or normal state in accordance with the improved status of the self-diagnosis result. Because the environment state detection result cannot be improved by the operation of the contamination removal hardware, the contamination removal hardware is not started except for contamination detection. Further, the fail determination unit implements a fail determination in accordance with the result of detection of water droplets, cloudiness, or low visibility.

A sign detection fail determination unit 304 implements a fail determination during a sign detection operation. FIG. 15 shows an example of a sign detection fail determination table. In the table, threshold values corresponding to the sign detection durability are set. When the image diagnosis result indicates a value equal to or greater than the numerical values, the first or the suppression mode, implementation of the contamination removal hardware, or a fail determination is selected.

In the initial stage, the first suppression mode is selected. However, as the contamination or environment becomes harsher, the mode successively transitions to the selection of the second suppression mode, the contamination removal hardware, and fail. However, if the contamination state is improved after implementation of the contamination removal hardware, the mode may return to the suppression mode or normal state in accordance with the improved status of the self-diagnosis result. Because the environment state detection result cannot be improved by the operation of the contamination removal hardware, the contamination removal hardware is not started except for contamination detection. Further, the fail determination unit implements a fail determination in accordance with the result of detection of water droplets, cloudiness, or low visibility.

Figure 4:
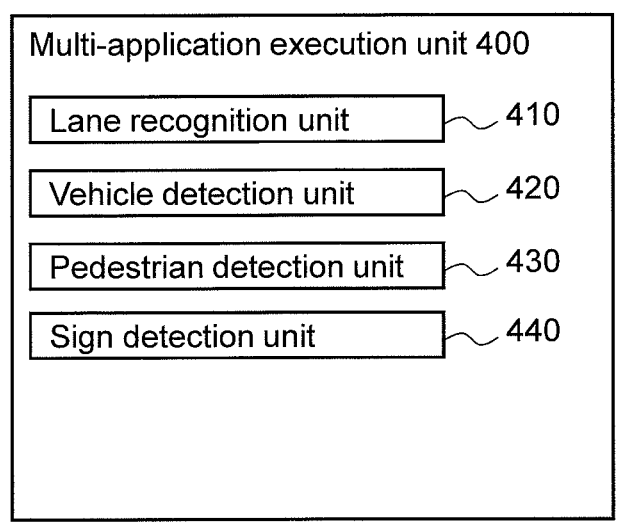
FIG. 4 is a configuration diagram of an application execution unit.

FIG. 4 is a block diagram of the configuration of the multi-application execution unit 400. In the present example, each application is executed based on the information from the application-by-application fail determination unit. In some cases, the operation may be stopped when only lane recognition is in fail state from the contamination state. In other cases, the application may temporarily enter fail state from the contamination removal hardware operating state, and may then be re-executed after the elapse of a certain time.

In the multi-application execution unit 400, a lane recognition unit 410, a vehicle detection unit 420, a pedestrian detection unit 430, and a sign detection unit 440 are present. An execution method is determined based on the result from each fail determination unit.

The system may be designed such that a system fail is triggered if the operation of even one application that has been operating up to now is disabled by the condition of contamination and the like. In practice, even when the state is such that vehicle detection is not operable, execution may not be impossible because lane recognition can still maintain recognition performance. However, because it may be difficult to see, from the user's point of view, what is being operated, a fail of the system as a whole may be clarified to give priority to the ease of understanding by the user by design. Here, it is necessary to consider the fail condition for only the operating application by making a fail determination on an application-by-application basis. Thus, an increase in the operation range as a system can be expected during the operation of only an application with high durability.

Alternatively, the system may be configured such that the user can be notified of the fail state on an application-by-application basis in greater detail. Here, while it may become slightly more difficult for the user to understand, the adaptive range of each application can be maximally taken advantage of whereby the adaptive range in which the user can benefit from each application can be maximally expanded. Regardless of the presence or absence of operation, the fail may be adapted to the application with the lowest environment resistance performance among executable applications.

The effectiveness of the present implementation example lies in the fact that, because the design enables fail determination adapted to each application, the system as a whole can be easily put together even when the type of multiple applications is modified. In the case of contamination detection using a single application as the object, as is conventionally done, a plurality of techniques are developed, such as a contamination detection technique dedicated for lane recognition, and another contamination detection technique dedicated for vehicle detection. However, this results in spending wastefully large computing costs even though similar results are obtained using similar processes. In the present implementation example, when the contamination object as the object of analysis is the same, image analysis is implemented using the same logic, and the suppression mode of each application or the request for operating the contamination removal hardware is implemented in consideration of the processing region or endurance performance of each application.

Figure 5:
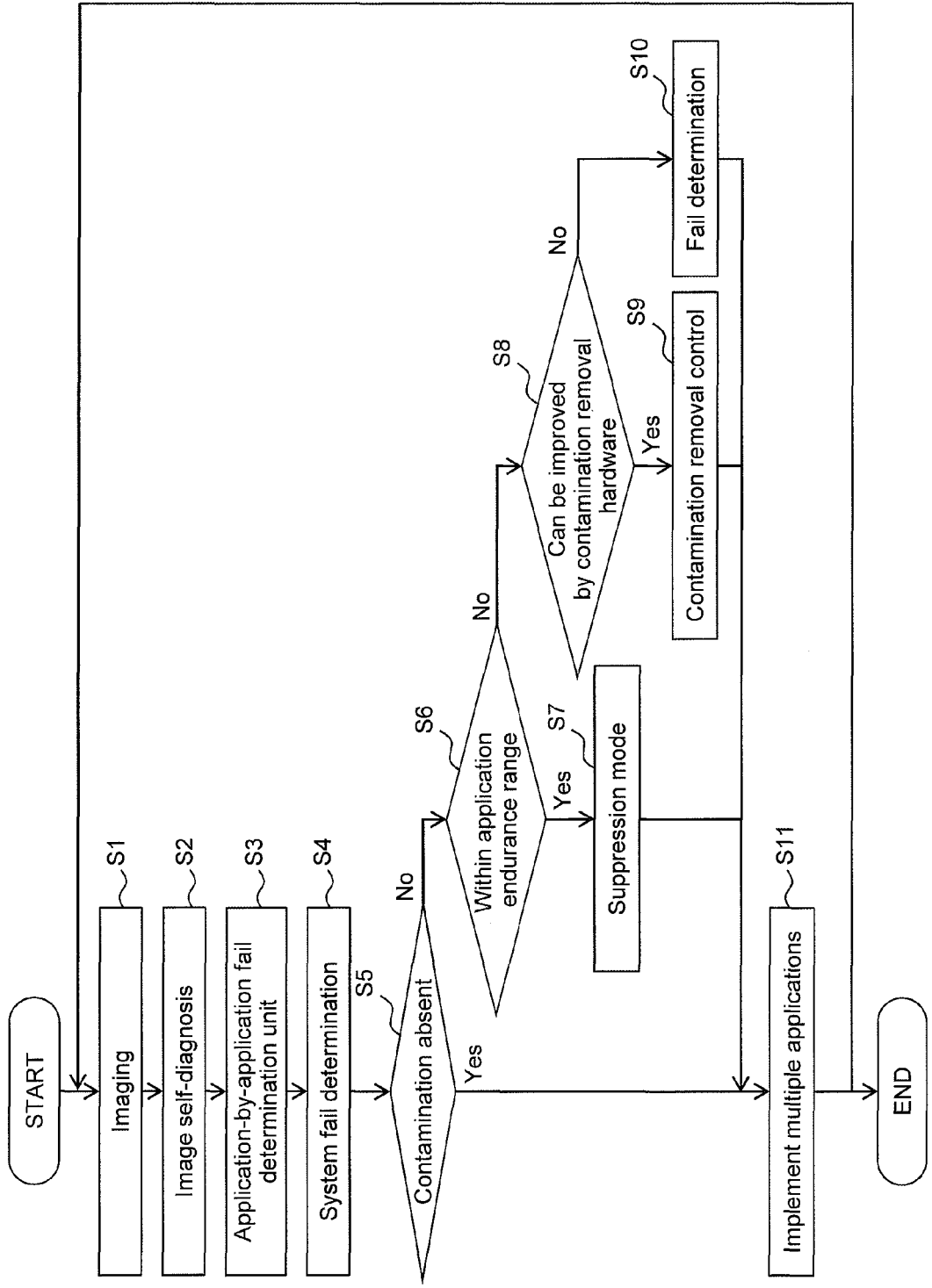
FIG. 5 illustrates the overall process flow of the vehicle-mounted environment recognition device according to the present invention.

FIG. 5 illustrates the flow of an overall process of the vehicle-mounted environment recognition device according to the present invention. Here, the processes described below are successively implemented.

In step S1, an image is taken with the vehicle-mounted camera.

Figure 8:
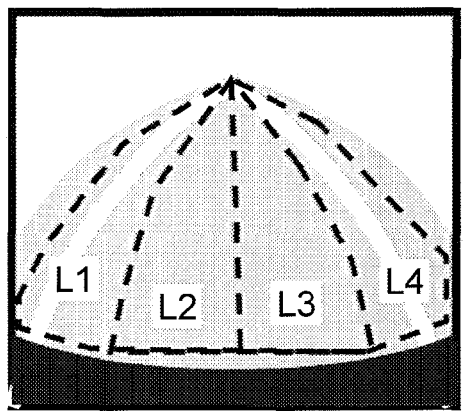
FIG. 8 is an explanation drawing of a map score utilization method for lane recognition.
Figure 8:
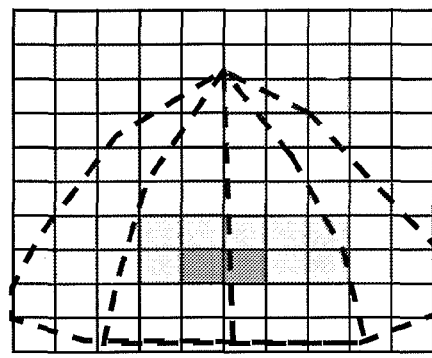
Figure 8:
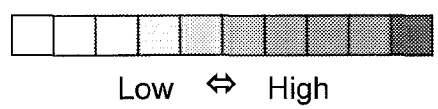

In step S2, using the image taken in step S1, the lens contamination state, the light source environment, the road surface status and the like are determined in the image self-diagnosis unit 200. FIG. 8 is an explanation drawing for a map score utilization method for lane recognition. The output of the image self-diagnosis unit 200 is set in consideration of the information desired by the multiple applications utilizing the diagnosis result and the feature of the image diagnosis logic.

In step S3, individual application fail determination is made. FIG. 7 shows an image self-diagnosis output table which is utilized to put together the response of each application. First, the scores on a map shown in FIG. 6 is based on a dividing method that takes into consideration the processing region of each application, as indicated by lane recognition in FIG. 8, vehicle detection in FIG. 9, pedestrian detection in FIG. 10, and sign detection in FIG. 11.

FIG. 8 is an explanation drawing for a map score utilization method for lane recognition. Here, a region that could be a processing region for lane deviation warning (LDW) is divided in the lateral direction, and the area in percentage of the attachment is calculated as a score for each of regions L1 to L4. Thus, water droplets in regions that are not processed by lane recognition on the image are disregarded, and the region as the object of lane recognition is divided for scoring. The region is divided for the following reason. It is possible to track the movement of a white line on the screen due to lane movement during lane change if the screen as a whole is contaminated in patches. However, when one of the divided regions is contaminated by 80% or more, for example, it can be expected that the probability of tracking being disabled when the white line enters that region on the screen is very high. In order to address such a situation, the scoring by region division is employed as a technique that makes it possible to compare the generally patchy contamination and the contamination in a localized region, providing the scores utilized for lane recognition fail determination.

What is important for lane recognition is that a white line is being recognized immediately before subject vehicle deviates from the white line. When this is considered, the above-described process of performing region computation uniformly from the score map may be used. However, the position on the image where the white line is photographed prior to lane deviation, which is important for lane recognition, is roughly determined. Thus, in consideration of the above importance, at the white line position prior to white line deviation, region computation is implemented after the score map is multiplied by an importance weighting map so as to enable implementation of the suppression mode, contamination removal, or fail determination at even more optimum timing for lane recognition.

In the case of the result of reflection detection, the manner of influence differs depending on each application. In lane recognition, the region that provides an erroneous detection factor is not a location where the score on the map score is high but rather a location with a low score. In the case of reflection detection, the logic is such that the higher the brightness compared with the surrounding areas, the higher the score will be. However, in white line recognition, a saturated high brightness region, for example, does not provide an erroneous white line detection factor because of the condition of being too thick compared with a white line, for example. Rather, a linear region thinly extending from a high brightness region often provides an erroneous detection factor. By utilizing this property, the method of converting the scores on the map may be such that the regions with higher scores are counted lower, while regions with scores that are not zero but low are counted higher, so that the scores can be reflected in the reflection strength result using the multiplicity of the reflection regions as an indicator.

Figure 9:
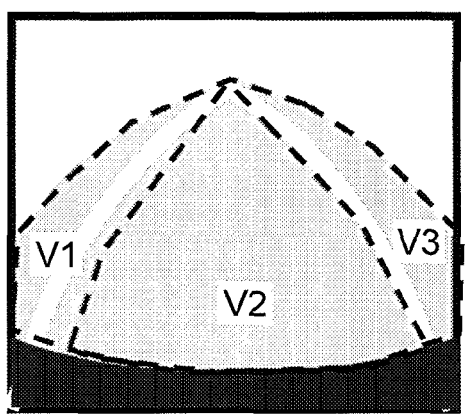
FIG. 9 is an explanation drawing of a map score utilization method for vehicle detection.
Figure 9:
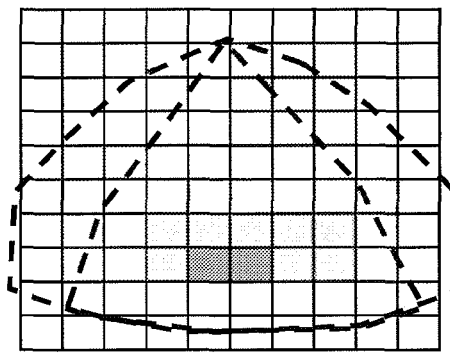
Figure 9:
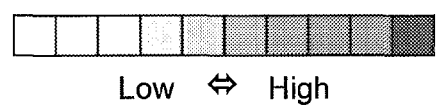

FIG. 9 is an explanation drawing for a map score utilization method for vehicle detection. Here, as in lane recognition, the processing region as the object of recognition is divided so that localized contamination can be responded to, and the highest score in this region is utilized as a final score. Particularly, with regard to vehicle detection, the difficulty in recognition by the camera can be extracted as a score for each processing region by determining whether the object of recognition should be on a lane by lane basis by dividing the region based on the white line in accordance with the result of lane recognition. The dividing method may be dynamically modified in accordance with the movement in the lane. For vehicle recognition, recognition performance is more greatly influenced by a contamination at a distance even when the size of the contamination on the screen is the same. This is because when a slight contamination is attached to a part at a distance, the ratio of invisibility of a vehicle body located at a distance is large, while if the contamination is near, this simply means that only a part of the vehicle body is invisible, and the invisibility ratio is small in the first place compared with the size of the vehicle body in the screen. This may be considered for region computation. Namely, the score may be computed in terms of the ratio of what percentage is occupied by the contamination in the world coordinates in the vehicle detection processing region. In this way, rather than being an index of the contamination ratio on the screen, the score may be expressed as an index of invisibility of a vehicle located at a certain position on the road surface on the world coordinates. Thus, a threshold value can be obtained that facilitates the consideration of an appropriate timing for contamination removal or fail.

In the case of reflection detection, when the computation of the reflection region of FIG. 13 is implemented, the scores on the map indicate higher brightness than the surrounding areas. Thus, in vehicle detection, it is desirable to include even a little brightness as the object of processing so that a vehicle body feature amount around the headlight can be acquired. Thus, scores of values not more than a certain constant value are eliminated from the object of counting when the region computation is implemented. In this way, the influence of reflection on vehicle detection can be stably determined, whereby transition to the suppression mode and the like can be made at appropriate timing.

Figure 10:
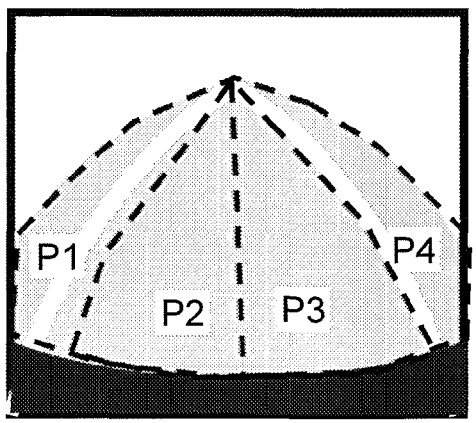
FIG. 10 is an explanation drawing of a map score utilization method for pedestrian detection.
Figure 10:
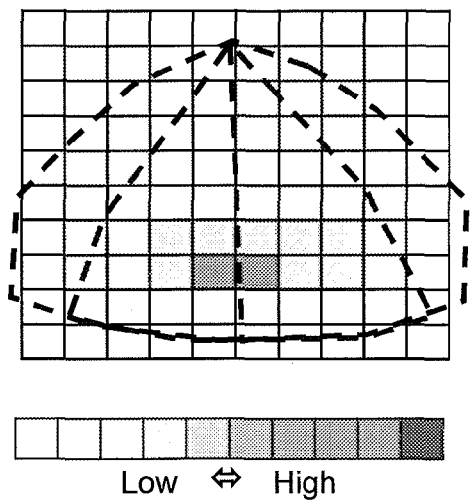

FIG. 10 is an explanation drawing for a map score utilization method for pedestrian detection. Here, as in lane recognition, the processing region as the object of recognition is divided so that localized contamination can be responded to, and the highest score in the regions is utilized as a final score. The scores may be also divided in the depth direction, as opposed to FIG. 10. In pedestrian detection, as in vehicle detection, by implementing the region computation from the viewpoint of to what degree the region is made invisible by contamination in the world coordinates, a decrease in the object of detection in the real world can be numerically expressed, whereby a transition to the suppression mode, contamination removal, or fail determination can be implemented at appropriate timing.

Figure 11:
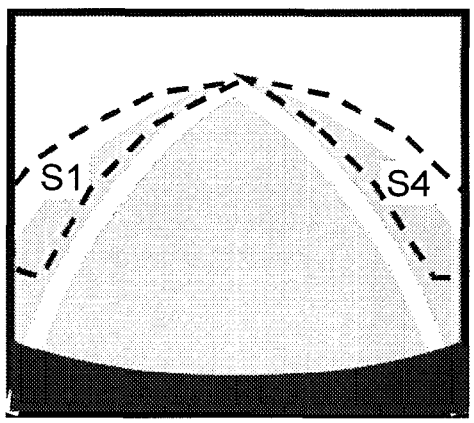
FIG. 11 is an explanation drawing of a map score utilization method for sign detection.
Figure 11:
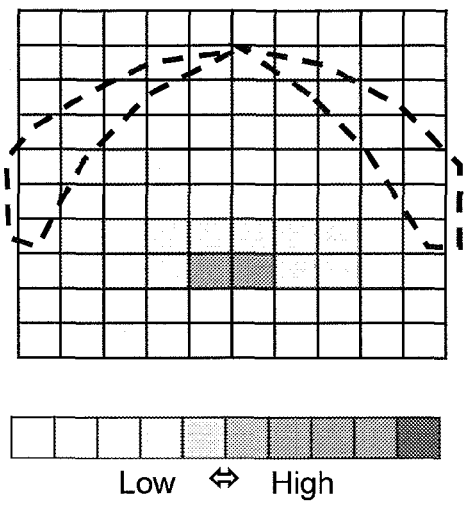

FIG. 11 is an explanation drawing for a map score utilization method for sign detection. Here, on the assumption that there is no object of recognition on the road that subject vehicle travels on, processing regions are provided to the left and right of the road that the vehicle travels on so as to detect signs standing outside the road, and scores are calculated for the left and right sides separately. When traffic signals and the like are also included as the object of recognition and processing, processing region setting may be implemented assuming the presence of the object in the air over the travelling road. In sign detection, as in vehicle detection, by implementing the region computation from the viewpoint of to what degree the road surface is made invisible by contamination in the world coordinates, a decrease in the object of detection in the real world can be numerically expressed, whereby transition to the suppression mode, contamination removal, or fail determination can be implemented at appropriate timing.

In what differs greatly from the other applications, because signs located significantly higher than the road surface are considered to be the object of recognition, the probability of influence by reflection on the road surface, reflection by a road surface water film, or the travelling road environment is extremely low. Thus, the table setting of FIG. 15 is such that no transition to the suppression mode occurs.

Based on the highest-score region in the divided regions, the multi-application response method is selected. During image diagnosis, the attached water droplets, cloudiness, and low visibility are processed in as wide a processing range as possible, and the result is modified into a score taking into consideration the processing region of the multiple applications that utilize the result for fail determination in each application. In this way, appropriate scoring can be performed considering the properties of each application. Furthermore, by utilizing the score, an indicator can be obtained that can be easily utilized for the selection of the response method as shown in FIGS. 12 to 15 in which the contamination resisting performance of the applications is considered.

Because the amount of contamination in the processing region of each logic is used as an indicator, an indicator having high correlation between the amount of contamination and a logic performance decrease due to contamination can be readily created, and the fail determination as shown in FIGS. 12 to 15 is implemented based on the indicator.

The fail determination table may be dynamically modified in accordance with the scene so that the fail determination table can be utilized for the suppression mode, contamination removal, or fail determination at even more appropriate timing. With regard to water droplets detection, based on the assumption that water droplets do not become attached to the camera lens surface immediately after the start of rain, for example, reference to the water droplets detection value may be made after the rain is determined by weather detection. In a method, in order to prevent erroneous operation of the suppression mode, the starting of contamination removal hardware, or fail determination, a rain determination result by weather detection may be required and used along with detection logic. However, under the condition of the result of rain determination detection lasting for a certain time or longer, at the end of a windshield wiper operation that has cleared the condition, the result of water droplets detection may be utilized for a certain period of time, considering that the probability of water splashing from the road surface is high because the road surface is still wet right after the rain. Instead of the rain determination by weather detection, the operation of the windshield wiper may be substituted.

When snow determination is made by the weather detection unit, for example, rolling-up of snow or snow melting agent can be expected, and lens contamination may proceed rapidly. Thus, the cloudiness or low visibility threshold value may be reviewed so as to rapidly transition to the suppression mode or start contamination removal hardware.

In step S4, system fail determination is implemented. The response method corresponding to the image self-diagnosis result is shown with respect to lane recognition in FIG. 8, vehicle detection in FIG. 9, pedestrian detection in FIG. 10, and sign detection in FIG. 11. However, not only the contamination resisting performance of each application differs, but also the strength of durability of each application may vary depending on the type of contamination. For example, in the case of lane recognition, the durability with respect to low visibility type contamination, such as contamination by mud and the like, is relatively high. This is due to the fact that, because the object of recognition is broken lines or Bott's dots in the first place, sufficient recognition performance can be maintained even when a part of the white line is invisible due to mud on the lens if the part of the white line can be identified from the regions ahead and behind.

Conversely, in the case of pedestrian detection and the like, when a location where a distant pedestrian is imaged is contaminated even if the region is small on the image, if the status is such that it can be expected that the upper body of the pedestrian would be hidden, it is difficult to maintain performance, so that the contamination resistance is not so high. Also, vehicle detection does not have very high contamination resistance, as in pedestrian detection. However, because the size of the object of detection on the image is large, the overall contamination resistance is generally slightly higher than pedestrian detection.

Sign detection does not have high contamination resistance either, as in pedestrian detection. Thus, if the distant field of view is blocked, recognition becomes difficult. However, sign detection, as opposed to other applications, has the limitation that the signs are installed at relatively high locations. Thus, with respect to a road surface water film, road surface reflection and the like, normal recognition is often possible even in a status where other applications would have difficulty recognizing, so that the durability against road surface water films or road surface reflection is high. The fail computing unit 310 of FIG. 3 implements fail determination taking such difference in durability depending on the application into consideration.

For example, the lane recognition fail determination unit 301, based on the lane recognition fail determination table shown in FIG. 12, performs a determination process with regard to a response that takes the lane recognition contamination resistance into consideration. The first suppression mode in the table of FIG. 12 indicates a suppression mode for lane recognition and is a mode in which, in a scene where a number of erroneous detections are likely to occur, parameters are modified or an erroneous detection suppression module for lane recognition is additionally operated to reinforce contamination resistance. An erroneous warning suppression is performed, such as by making the condition for line extraction more stringent, or suppressing warning if the white line reliability is not higher than a normal time.

The second suppression mode is an operation mode that is tuned so as to further suppress erroneous detection. In this mode, the processing region is decreased to the nearby half so as to reduce erroneous detection by road surface reflection of headlight that enters the processing region in order to prevent reflection from cars behind, even at the expense of accuracy in the lane recognition position, yaw angle, curvature and the like.

The first suppression mode and the second suppression mode relate to operations that are closed within the lane recognition application without being related to other applications. Thus, the operation is handed to the system control unit 350 and executed as is by the lane recognition unit 410 of the application execution unit 400.

In step S5, if the system fail determination unit 352 determines, based on the image self-diagnosis result, the first or the second suppression mode, the starting of contamination removal hardware, or a system fail, "No" is selected. If there is no contamination, the determination is "Yes". However, based on information other than the image self-diagnosis result, such as vehicle information, transition to the suppression mode, the starting of contamination removal hardware, or fail determination may be compulsorily implemented.

In step S6, when the presence of contamination, reflection and the like is recognized in accordance with the image self-diagnosis result, it is determined whether the presence is within the endurance range of the application. If within a range such that a response can be made with the suppression mode for suppressing erroneous detection of image recognition, the determination is "Yes". If it is judged that it is difficult to respond with only a software process for erroneous detection suppression, the determination is "No".

In step S7, when the determination in step S6 has been "Yes", it is determined that a response is possible with only application software process modification, and each application is started in the erroneous detection suppression mode.

In step S8, when the determination in step S6 has been "No", it is determined whether the contamination can be removed by starting contamination removal hardware. Based on the result of diagnosis in the image self-diagnosis S2, it is judged whether the contamination is attached to the lens. When the cause is bad weather, a road surface reflection, a road surface water film, a light source environment, the travelling road environment and the like, the image recognition environment cannot be improved by cleaning the lens itself. However, when the diagnosis result is due to lens contamination and an improvement can be expected by contamination removal hardware, it is determined "Yes"; if no improvement is expected, it is determined "No".

However, when there is past history of absence of the effect of contamination removal despite a determination of lens contamination, this may be taken into consideration and the determination of "No" may be made, indicating that no improvement will be possible with the contamination removal hardware.

In step S9, when it has been determined in step S8 that the lens state can be improved by contamination removal hardware, contamination removal control is implemented.

In step S10, when it has been determined in step S8 that the lens state cannot be improved by contamination removal hardware, fail determination is made so as to let the user know that the current image recognition application is in a status incapable of normal operation, or to stop the operation of the application.

Fail determination is a determination indicating that the application cannot be effectively operated, such as when the contamination could not be removed by implementing the contamination removal hardware and further contamination has become attached, or when the attachment of contamination proceeded faster than the speed of contamination removal. The determination means that the operation of the application is given up as a final determination when no response is possible with the first suppression mode or the second suppression mode, assuming the absence of contamination removal hardware.

The system control unit 350 is notified of the result of fail determination, and the fail determination is made on an application-by-application basis. Thus, by operating the application to the limit of its performance, the adaptive range of the application can be expanded. Obviously, in order to enable the user to more simply monitor the state of system operation, only the operating applications may be considered and, if even one of the applications is given a fail determination, the system as a whole may be given a fail determination. Even more simply, the system as a whole may be considered to be a fail if even one of all of the applications is given a fail determination. In this way, fail setting can be made by taking the contamination resisting performance of each application into consideration.

The operation of the fail determination unit of each application will be described later. Here, the outline of lane recognition will be described so as to show the overall process flow. Description of the operation other applications will be omitted.

In step S11, these results are considered, and when routes other than the fail step of S10 have been followed, the multiple applications are operated in consideration of the result corresponding to the respective application.

The determinations in determining steps S5 to S10 in the system fail unit are implemented for each application (lane, vehicle, pedestrian, or sign), and finally the multiple applications are executed. In this way, a response can be made in consideration of the contamination resisting performance of each application, whereby a fail determination and the like can be made on an application-by-application basis. During system development too, if there is the above-described mechanism as a base function, an increase in the number of mounted applications, for example, can be simply handled.

Next, lane recognition fail determination will be described with reference to an example of the lane recognition fail determination table shown in FIG. 12. In the following, four types of response methods adapted to the image diagnosis result will be described.

Lane recognition has high contamination resistance compared with the other image recognition applications (vehicle detection, pedestrian detection, or sign detection). However, as the contamination increases, erroneous detection increases. As a method for addressing this, in a range such that a response with image recognition software process modification is possible, a response is made in the first suppression mode or the second suppression mode. This is utilized when the amount of contamination attached to the lens is large, or when the road surface state is poor and it is determined that the probability of erroneous warning is high.

In the first suppression mode, the condition where the white line feature amounts are linearly arranged when selecting a white line is made more stringent so that a white line candidate is recognized only when the line is longer or the feature amount number is greater. In this way, while the state of lack of detection may be increased, erroneous warning in an unstable state can be suppressed.

Further, while the number of linearly arranged white line feature amounts is analyzed in the chronological direction and whether a warning is to be sounded is determined based on the visibility numerically expressing whether the white line is in an easily visible status, erroneous warning is suppressed by implementing an adjustment such that warning is sounded only when the visibility is relatively high or the probability of the white line being highly visible is high compared with a normal time. Also, when the final lane detection result is analyzed in the chronological direction, lateral position stability to the detected white line and stability in yaw angle indicating the inclination between the lane and the vehicle are also analyzed, and an adjustment is implemented such that warning is sounded only when there is some stability.

In the second suppression mode, the countermeasure implemented in the first suppression mode is basically continuously implemented, and additionally, an adjustment is implemented to bring the processing region nearer so that a strong road surface reflection or a distant noise factor will not be erroneously recognized, thus suppressing erroneous detection and reducing erroneous warning. Visibility and linear extraction conditions and the like are made even more stringent so as to increase the tendency for lack of detection, implementing adjustments for erroneous detection suppression. Also in terms of suppressing erroneous warning, the timing of warning is slightly delayed by design so that warning will not be sounded just because a tire has only slightly deviated, thus suppressing erroneous warning and preventing the user from being bothered as much as possible as a design principle.

In the first suppression mode and the second suppression mode, when there is attached contamination that is difficult to respond to, contamination removal hardware is activated and, if the lens contamination state is mitigated, the recognition process is implemented in the first suppression mode, the second suppression mode, or in normal state in accordance with the contamination state. If there is no improvement in the contamination state, or if the contamination state has deteriorated even more, a fail determination is implemented to give up image recognition.

Threshold value setting in accordance with the image diagnosis result is as shown in FIG. 12, where water droplets, cloudiness, and low visibility have high durability numerical values compared with the other applications. Because reflection detection cannot be responded to by contamination removal hardware, a fail determination may be made in a very harsh road surface reflection state.

With respect to the road surface water film, a fail determination is not implemented. With respect to the travelling road environment too, contamination removal and fail determination are not implemented, although the first suppression mode or the second suppression mode may be implemented. The same applies to the ambient light source environment and weather. For the windshield wiper, a rain state is estimated from the front windshield wiper state and utilized for the suppression mode or fail determination. In the contamination hardware started state, the contamination removal hardware information is not suitable for image recognition because contamination is being removed. Thus, the first and the suppression modes are used for a response. When no effect of contamination removal hardware activation is recognized, a fail determination is implemented.

Vehicle detection fail determination will be described with reference to an example of the vehicle detection fail determination table shown in FIG. 13. In the following, four types of response methods adapted to the image diagnosis result will be described.

In vehicle detection, compared with the other image recognition applications (lane recognition, pedestrian detection, and sign detection), contamination resistance is not very high, and erroneous detection increases as contamination increases. In a method for responding to this, within a range such that a response can be made by image recognition software process modification, the first suppression mode or the second suppression mode is used for a response. This is utilized when the amount of contamination attached to the lens is large, or when the road surface state is poor such that it is determined that the probability of erroneous warning is high.

In the first suppression mode, the time before a vehicle is finally recognized is extended compared with a normal time so that detection is made only when the certainty of being a vehicle is high. Erroneous detection suppression is implemented at the expense of the maximum detection distance to some degree. An adjustment is implemented to make it easier for water film reflection or headlight road surface reflection countermeasure logic determination, and vehicle erroneous detection is suppressed based on the result of the determination.

In the second suppression mode, it is very effective, in suppressing erroneous detection, to shorten the detection distance by bringing the processing region nearer so that road surface reflection or a distant noise factor will not be erroneously recognized. Further, the vehicle as the object of detection is narrowed to one which is highly dangerous to subject vehicle, and the other vehicles are eliminated from the object of recognition, thus reducing erroneous detection. For example, in the case of a front camera, only a vehicle running in front in the travel lane of subject vehicle is selected as the object. In the case of a rearward camera, only a vehicle approaching subject vehicle may be selected as the object. By thus narrowing the object of detection, erroneous detection reduction is implemented.

When there is attached contamination which is difficult to respond to, the first suppression mode or the second suppression mode is activated and, if the lens contamination state is mitigated by activating contamination removal hardware, the recognition process is implemented in the first suppression mode, the second suppression mode, or normal state in accordance with the contamination state. If no improvement in contamination state is recognized, or if the contamination state deteriorates even more, a fail determination is implemented to give up image recognition.

In vehicle detection, the number of the suppression modes may be increased, for example, so that mode management can be implemented in accordance with the surrounding environment. For example, when the probability of rain is high, it is necessary to reinforce the road surface reflection or water droplets countermeasure, making adjustments so that vehicle detection can be made when the lens is cloudy or has low contrast. By switching to a mode appropriate for the respective state, a mode management method is provided whereby overall performance can be improved.

Threshold value setting adapted to the image diagnosis result is such that, as shown in FIG. 13, water droplets, cloudiness, low visibility do not have very high durability numerical values compared with the other applications. Because reflection detection cannot be responded to by contamination removal hardware, a fail determination is made in a road surface reflection state. With respect to the road surface water film, fail determination is not implemented.

Because vehicle detection is not readily influenced by the travelling road environment, information about the travelling road environment is not particularly utilized. With regard to the ambient light source environment and weather, the first suppression mode or the second suppression mode is used for a response. With regard to the windshield wiper, the rain state is estimated from the front windshield wiper state and utilized for the second suppression mode or fail determination. Because the contamination removal hardware information is not suitable for image recognition when the contamination hardware is started and contamination is being removed, the first suppression mode or the second suppression mode is used for a response. If no effect of activation of contamination removal hardware is recognized, a fail determination is implemented.

Pedestrian detection fail determination will be described with reference to an example of the pedestrian detection fail determination table shown in FIG. 14. In the following, four types of response methods adapted to the image diagnosis result will be described.

Pedestrian detection has low contamination resistance compared with the other image recognition applications (lane recognition, vehicle detection, and sign detection), and erroneous detection increases as contamination increases. In a method for responding to this, in a range such that a response can be made by image recognition software process modification, the first suppression mode or the second suppression mode is used for a response. This is utilized when the amount of contamination attached to the lens is large, or when the road surface state is poor and it is determined that the probability of erroneous warning is high.

In the first suppression mode, the time before a pedestrian is finally recognized is extended compared with a normal time so that detection is made only when the certainty of being a pedestrian is high. Erroneous detection suppression is implemented at the expense of the maximum detection distance to some degree.

In the second suppression mode, it is highly effective in suppressing erroneous detection to bring the processing region nearer and reduce the detection distance approximately in half so that road surface reflection or a distant noise factor will not be erroneously recognized.

In the first suppression mode and the second suppression mode, when there is attached contamination which is difficult to respond to, contamination removal hardware is activated, and, if the lens contamination state is mitigated, the recognition process is implemented in the first suppression mode, the second suppression mode, or normal state in accordance with the contamination state. If no effect of improvement in contamination state is recognized, or if the contamination state deteriorates even more, a fail determination is implemented to give up image recognition.

As illustrated in FIG. 14, the threshold value setting in accordance with the image diagnosis result is such that water droplets, cloudiness, and low visibility have low durability numerical values compared with the other applications. Because reflection detection cannot be responded to by contamination removal hardware, a fail determination is issued in a road surface reflection state. With respect to road surface water film, fail determination is not implemented.

In pedestrian detection, because there is little influence of travelling road environment, the information about travelling road environment is not particularly utilized. With respect to ambient light source environment and weather, the first suppression mode or the second suppression mode is sued for a response. The windshield wiper is utilized for the first suppression mode, the second suppression mode, or fail determination by estimating the rain state from the front windshield wiper state. The contamination removal hardware information is not suitable for image recognition when the contamination hardware is started and removing contamination. Thus, in this case, the first suppression mode or the second suppression mode is used for a response. When the effect of activation of contamination removal hardware is not recognizable, fail determination is implemented.

Sign detection fail determination will be described with reference to an example of the sign detection fail determination table shown in FIG. 15. In the following, four types of response methods adapted to the image diagnosis result will be described.

Sign detection has low contamination resistance compared with the other image recognition applications (lane recognition, vehicle detection, and pedestrian detection), so that, as the contamination increases, erroneous detection increases. As a method for responding to this, the first suppression mode or the second suppression mode is used for a response in a range such that image recognition software process modification may be used for the response. This is utilized when the amount of contamination attached to the lens is large and it is determined that the road surface state is such that the probability of erroneous recognition is high.

Because sign detection is conducted using signs high above the road surface as the object, there is no direct influence of a road surface reflection or the road surface being wet on recognition performance. However, because small signs on the screen are used as the object of detection, contamination resisting performance is low with respect to water droplets or contamination.

In the first suppression mode, the time before a sign is finally recognized is extended compared with a normal time so as to make a detection only when the certainty of being a sign is high. At the expense of the maximum detection distance to some degree, erroneous detection suppression is implemented.

In the second suppression mode, it is very effective in suppressing erroneous detection to bring the processing region nearer and shorten the detection distance so that a distant noise factor will not be erroneously recognized.

In the first suppression mode and the second suppression mode, when there is attached contamination that is difficult to respond to, contamination removal hardware is activated. If the lens contamination state is mitigated, the recognition process is implemented in the first suppression mode, the second suppression mode, or normal state in accordance with the contamination state. If no improvement in contamination state is recognized, or if the contamination state deteriorates even more, a fail determination is implemented to give up image recognition.

The threshold value setting in accordance with the image diagnosis result is such that, as illustrated in FIG. 15, water droplets, cloudiness, and low visibility have low durability numerical values compared with the other application. With respect to reflection detection, it is determined that the road surface reflection state does not have direct influence on sign detection recognition performance. Thus, the road surface reflection state is not utilized for fail determination.

With respect to the ambient light source environment and weather, the first suppression mode or the second suppression mode is used for a response, and a fail determination is made in the case of backlight at the time of late-afternoon sunlight and the like. With respect to the windshield wiper, the rain state is estimated from the front windshield wiper state and utilized for suppression mode or fail determination. The contamination removal hardware information is not suitable for image recognition when the contamination hardware is in started state and contamination is being removed, and therefore the suppression modes are used for a response. If no effect of contamination removal hardware activation is recognized, fail determination is implemented.

Thus, according to the present invention, as contamination on the camera increases, the lens contamination status of the imaging device is determined on an application-by-application basis in consideration of the contamination resisting performance which generally differs among respective applications, and the suppression modes, contamination removal control, or fail determination is implemented. Thus, stable image recognition application operation can be ensured on an application-by-application basis, and the operation adaptive range of the applications can be effectively expanded, contributing to an increase in performance of the system that recognizes the in-vehicle environment.

By using threshold values for the above determination, and by utilizing maps storing the threshold values and the like, modification of software operating the system can be easily, reliably, and inexpensively implemented on an application-by-application basis.

As contamination on the camera increases, by determining whether the contamination is within an endurance range on an application-by-application basis, erroneous detection due to the contamination on the camera lens can be prevented.

When a determination is made on an application-by-application basis and the suppression modes, contamination removal control, or fail determination is implemented, the operation of the system is limited only to a necessary application by narrowing the object to an application being operated. In this way, selection of only a desired application as the object in various statuses can be easily implemented without modifying the system as a whole.

REFERENCE SIGNS LIST

10 Vehicle-mounted environment recognition device
100 Imaging unit,
200 Image self-diagnosis unit
201 Lens water droplets detection unit
202 Lens cloudiness detection unit
204 Low visibility detection unit
206 Reflection detection unit
207 Road surface water film detection unit
208 Travelling road environment detection unit
209 Light source environment detection unit
210 Weather detection unit
300 Application-by-application fail determination unit
301 Lane recognition fail determination unit
302 Vehicle detection fail determination unit
303 Pedestrian detection fail determination unit
304 Sign detection fail determination unit
310 Fail computing unit
350 System control unit
351 System operation monitoring unit
352 System fail determination unit
353 Contamination removal control unit
360 Vehicle information unit
400 Multi-application execution unit
410 Lane recognition unit
420 Vehicle detection unit
430 Pedestrian detection unit
440 Sign detection unit All publications, patents, and patent applications cited herein are incorporated herein by reference in their entirely.

The invention claimed is:

1. A vehicle-mounted environment recognition device comprising:
an imaging unit that acquires an image taken by an imaging device;

an image self-diagnosis unit that diagnoses a lens contamination state of the imaging device and an ambient environment with respect to the image acquired by the imaging unit;
an application execution unit that executes an application selected from a predetermined application group comprising lane recognition, vehicle detection, and pedestrian detection; and
a fail determination unit that determines, based on a result of comparison of a result of diagnosis by the image self-diagnosis unit relating to the lens contamination state and the ambient environment with a threshold value set in advance for each application, one or more from the group consisting of: whether the application executed by the application execution unit is to be transitioned to a suppression mode with an adjusted processing parameter for erroneous detection suppression, whether lens contamination removal control is to be performed, and whether a fail determination is to be made for the application,
wherein the image self-diagnosis unit sets a processing region for each application executed by the application execution unit, divides the processing region, diagnoses the lens contaminated state for each divided region, and outputs the diagnosis result.

2. The vehicle-mounted environment recognition device according to claim 1, wherein the image self-diagnosis unit includes a lens waterdrop detection unit, a lens cloudiness detection unit, and a low visibility detection unit, and outputs the diagnosis result relating to the lens contaminated state for each detection unit.

3. The vehicle-mounted environment recognition device according to claim 2, wherein the image self-diagnosis unit includes a reflection detection unit, a road surface water film detection unit, a travel road environment detection unit, a light source environment detection unit, and a weather detection unit, and outputs the diagnosis result relating to the ambient environment.

4. The vehicle-mounted environment recognition device according to claim 1, wherein the image self-diagnosis unit includes a reflection detection unit, a road surface water film detection unit, a travel road environment detection unit, a light source environment detection unit, and a weather detection unit, and outputs the diagnosis result relating to the ambient environment for each detection unit.

5. The vehicle-mounted environment recognition device according to claim 1, wherein
the image self-diagnosis unit computes a score indicating the lens contaminated state using a preset weight of an importance for each divided region, and
the fail determination unit performs the determination using the score as the diagnosis result.

6. The vehicle-mounted environment recognition device according to claim 1, wherein the image self-diagnosis unit dynamically changes the processing region to be divided in accordance with a movement of an object of recognition.

7. The vehicle-mounted environment recognition device according to claim 1, wherein the image self-diagnosis unit computes a score indicating the lens contaminated state on the basis of a percentage occupied by a contamination in world coordinates in the processing region, and
the fail determination unit performs the determination using the score as the diagnosis result.

* * * * *